United States Patent [19]
Shepper

[11] Patent Number: 5,953,543
[45] Date of Patent: Sep. 14, 1999

[54] INTEGUMENTARY ENCLOSURE FOR VIDEO EQUIPMENT

[76] Inventor: John P. Shepper, 1943 Forest Ave., Morton, Pa. 19070

[21] Appl. No.: 09/207,003

[22] Filed: Dec. 7, 1998

Related U.S. Application Data

[63] Continuation-in-part of application No. 08/985,885, Dec. 5, 1997, Pat. No. 5,848,299.

[51] Int. Cl.$^6$ .................................................. G03B 17/08
[52] U.S. Cl. .............................................................. 396/29
[58] Field of Search ............................... 396/25–29, 419, 396/420; 348/81; 206/316.1, 316.2, 316.3, 811

[56] References Cited

U.S. PATENT DOCUMENTS

| | | |
|---|---|---|
| 1,535,312 | 4/1925 | Hosking . |
| 3,026,784 | 3/1962 | Byers . |
| 3,042,796 | 7/1962 | Forest . |
| 3,065,666 | 11/1962 | Sampson . |
| 4,025,930 | 5/1977 | Wolff . |
| 4,071,066 | 1/1978 | Schaeffer . |
| 4,155,453 | 5/1979 | Ono . |
| 4,176,701 | 12/1979 | Welgan . |
| 4,381,144 | 4/1983 | Breslau . |
| 4,771,299 | 9/1988 | Gell, Jr. . |
| 5,087,934 | 2/1992 | Johnson . |
| 5,239,323 | 8/1993 | Johnson . |
| 5,456,277 | 10/1995 | Pontius, Jr. . |
| 5,610,655 | 3/1997 | Wakabayashi et al. . |

Primary Examiner—Howard B. Blankenship
Attorney, Agent, or Firm—Massinger Law Office

[57] ABSTRACT

A waterproof integumentary enclosure for electronic equipment, especially cameras and video cameras, is comprised of a thin transparent skin or membrane which enables submerged use of the equipment, provides a barrier to damaging water and particulate matter and simultaneously permits uninhibited access to and operation of audio, video and infra-red components of the equipment. The apparatus is comprised of three primary components including the integument, a support platform upon which the equipment is secured, and two embodiments of a combination air extraction and membrane closure means. Air within the system is withdrawn either manually or mechanically causing the membrane to collapse around and closely conform to the equipment thereby forming the integumentary barrier. Optional lens adapters are also included to improve filming quality and prevent condensation which might occur upon exposure of the system to temperature differences between air and water.

11 Claims, 15 Drawing Sheets

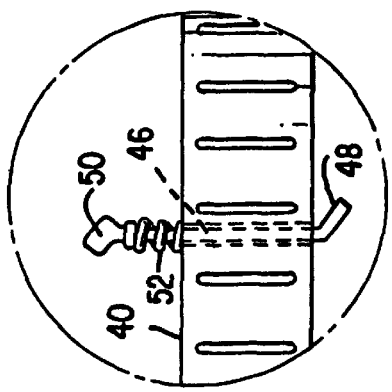
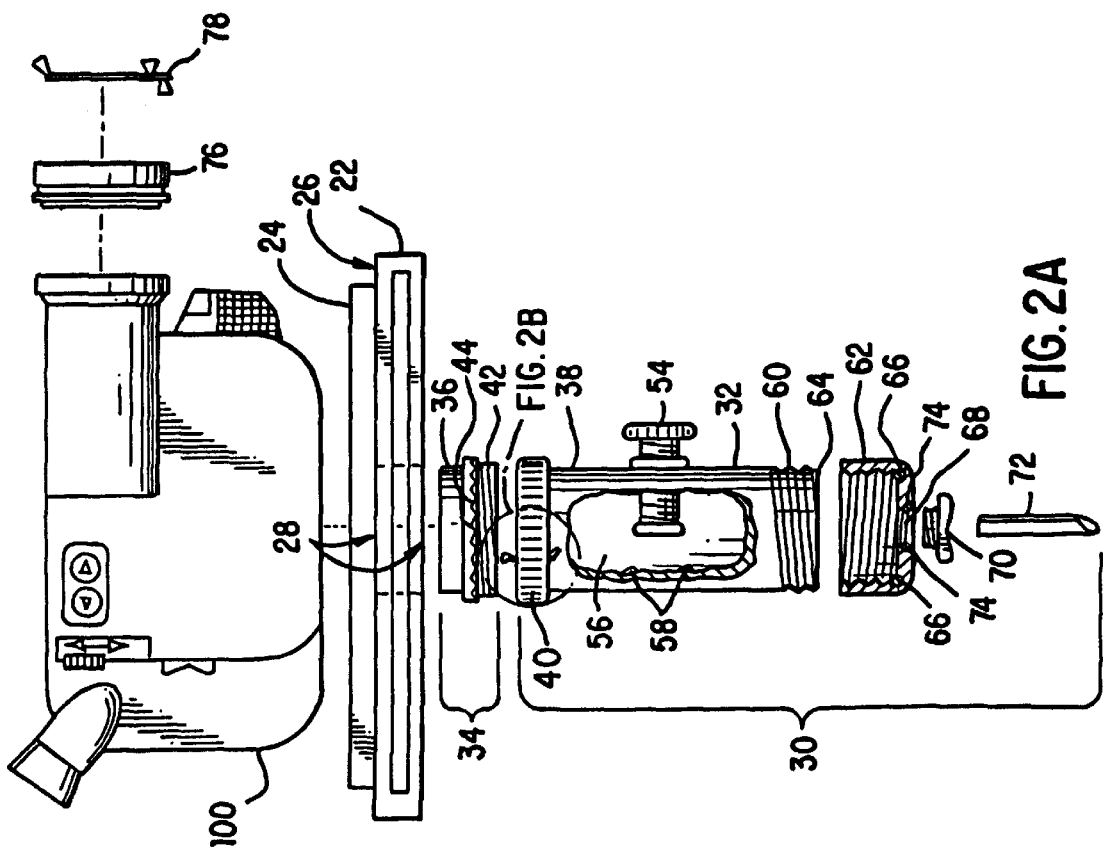

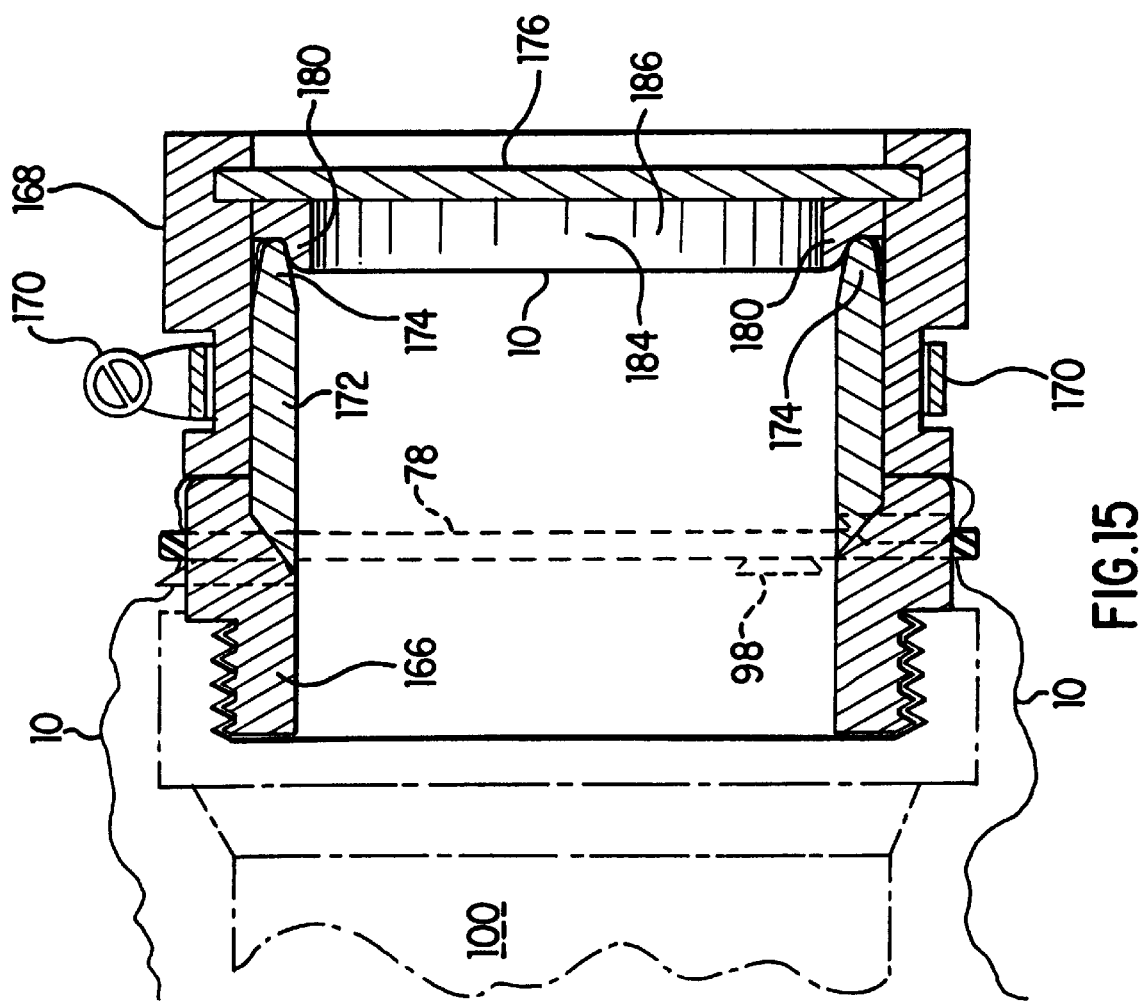

INTEGUMENTARY ENCLOSURE FOR VIDEO EQUIPMENT

CROSS REFERENCE

This is a continuation-in-part of application Ser. No. 08/985,885, now U.S. Pat. No. 5,848,299 entitled Entegumentary Enclosure For Video Equipment issued Dec. 8, 1998.

FIELD OF THE INVENTION

The subject invention relates to protective coverings for video equipment in general, and to a system for enclosing said equipment in a disposable, water-tight integument, in particular.

BACKGROUND OF THE INVENTION

Heretofore, a variety of devices have been employed to adapt conventional cameras and video cameras for underwater use. Still other devices have been developed which, to some extent, enable such electronic equipment to be used in inclement weather conditions or in environments otherwise hostile to the equipment such as the beach, for example. The subject invention provides a means for accomplishing each of these ends.

A review of the prior art reveals two general categories of waterproofing devices within which electronic equipment may be placed for protection. The first species share in common the employment of a rigid pressure hull or chamber adapted with external controls which are connected to and operate the camera held within the chamber. Such devices suffer from various shortcomings, namely they are bulky, overly complex in both structure and operation, and are cost prohibitive for the amateur photographer and even some professionals.

These shortcomings associated with rigid equipment vessels resulted in the development of the second species of protective devices which are generally comprised of a flexible bag-like enclosure with optical windows against which the camera's viewfinder and lens are to be placed. Such devices allow the user to operate the cameras controls through the surrounding flexible bag which is typically fabricated of a clear plastic material to facilitate this purpose.

One of the earliest references relating to this latter species of protective device is U.S. Pat. No. 1,535,312 issued to Hosking in 1925 which teaches a waterproof covering for cameras. The device consists of a flexible waterproof bag-like covering having draw strings at the bottom thereof for closure purposes. One serious limitation of this relatively simplistic device is that it requires the user to keep the camera upright when used underwater to prevent the entrance of water through the bag opening. In one embodiment, the Hosking reference teaches the use of a sash-like window against which the camera lense is placed.

In 1962, U.S. Pat. No. 3,026,784 was issued to Byers for an underwater photography enclosure with the open end of the bag being sealed, allowing a volume of entrapped air to remain such that the apparatus as a whole could float for purposes which are obvious. Similarly, U.S. Pat. No. 3,042,796 issued to De Forest in 1962 teaches a bag closing means similar to that disclosed in Byers and also teaches the entrapment of air for buoyancy purposes. The problem with each of these references and bag-like enclosures generally, however, is that any significant amount of entrapped air between the camera and the bag will make it more difficult to locate and operate the control buttons of the camera.

This problem was slightly corrected by U.S. Pat. Nos. 5,087,934 and 5,239,323, each issued to Johnson in 1992 and 1993 respectively, which teach a waterproof and flexible semi-rigid housing shaped to roughly conform to the shape of the camera equipment contained therein. By providing a camera-shaped bag rather than a conventionally shaped one, the Johnson device reduced the amount of entrapped air within the system, however, the shape of the enclosure could not be universally applied to all video cameras which are of different sizes and shapes and which may have viewfinders in different locations.

Finally, U.S. Pat. No. 4,771,299 issued to Gell, Jr. in 1988 teaches the use of a flexible waterproof container and a means of pressurizing the container so that the equipment may be used at greater depths by preventing the collapse of the flexible material and its molding around the camera under pressure.

Each of the above described references share in common the entrapment of air within the enclosure, whether incidentally as a result of their construction, or intentionally for the purpose of pressurizing the system for buoyancy or use at greater depths. Applicant has discovered that the exact opposite characteristic is desirable, namely providing an enclosure system which is relatively devoid of air. By withdrawing air from the system before closure, applicant has discovered a means of obviating those shortcomings associated with the prior art.

SUMMARY OF THE INVENTION

More particularly, the subject invention provides a waterproof enclosure for electronic equipment, especially video cameras, in the form of a thin transparent skin or membrane. This video equipment "integument" not only forms a barrier to damaging water and particulate matter, but so closely conforms to the shape of the underlying equipment as to be relatively unnoticeable during use. Accordingly, access to controls remains unobstructed. Moreover, the subject invention may be applied to any shape video or camera equipment without interfering with the proper performance of audio, video and infra-red components of the equipment.

To this end a first embodiment of the subject invention is comprised of three primary components. The first primary component consists of an optically transparent membrane that is substantially flexible in nature and impermeable to water and other fluids. The membrane is fabricated into a bag-like configuration having a single open end for the reception of the electronic equipment to be protected therein. The second primary component consists of a horizontally oriented planer support platform upon which the equipment is secured for use. The third and final primary component consists of a combination air extraction and membrane closure means. This third component consists very generally of an elongated tubular shaft member rotatably mounted to an aperture of slightly larger diameter located within the center of the support platform. A ratchet assembly is included in the platform-to-shaft connection such that the shaft is capable of precise incremental rotation. In operation, after the device to be protected is placed within the enclosure, the open end of the membrane is threaded through both the platform's aperture and tubular shaft until it emerges from the terminal end of the shaft. The opening of the membrane is then folded upwardly about the exterior circumference of the shaft and secured in place with an end cap. A thin air evacuation tube is inserted through an evacuation port located in the center of the end cap and into the shaft along the shaft's vertical axis. Thusly situated, the air evacuation tube is concentrically oriented inside the shaft and more particularly inside the membrane enclosure. The shaft is then rotated about the platform causing the membrane within to twist and seal itself about the exterior walls of the extraction tube. Air within the system is then withdrawn either manually or mechanically causing the membrane to collapse around and closely conform to the video equipment thereby forming an integumentary waterproof barrier. The evacuation tube is then withdrawn from the shaft whereupon the twisted portion of the membrane will collapse around itself to maintain the airtight seal. Additional rotation of the shaft may be performed to tighten the seal. Closure means are provided to seal the extraction port. As a final precaution, the shaft is adapted with a radially aligned compression screw which upon tightening will force the twisted membrane against the interior wall of the shaft to assure an airtight seal.

The second embodiment of the invention shares in common the first and second primary components described above, however the combination air extraction and membrane closure means of this second embodiment varies considerably in structure and method of use. More specifically, air extraction and membrane closure take place in a separate housing unit attached to the underside of the support platform. The housing is comprised generally of a base plate having a centrally oriented aperture concentrically aligned with the aperture of the platform. The base plate is adapted with four perpendicularly extending retaining walls about the perimeter of the aperture for the slidable reception of a compression pad which also has an aperture in concentric alignment with the apertures of the platform and base plate. Together, these apertures form a channel through which the open end of the membrane may be inserted. Once insertion is complete, the open end of the membrane is spread out evenly across the surface of the compression pad and held in place by membrane retention means such as hooks for instance. A lid is pivotally attached to the base plate and is adapted with a perpendicularly extending compression ring which, when the lid is closed, urges the membrane against the compression pad and thereby seals the open end of the membrane. The lid further includes an air evacuation port through its center in communication with the channel formed by the platform, base plate and compression pad. Air within the integumentary enclosure is withdrawn by vacuum through the channel, through a mono valve located within the interior of the compression ring and then out the evacuation port. The mono valve assures that vacuum within the enclosure is maintained such that the membrane is caused to collapse against and conform to the surface of the camera or video equipment housed therein.

Optional lens adapters are also included to assure filming quality during underwater use. The adapters provide a flat surface against which the optical membrane can rest to avoid distortion of the membrane when exposed to sub-atmospheric pressure experienced when the camera is submerged. The lens adapters are also designed to prevent condensation which might occur upon exposure of the system to temperature differences between air and water.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. For instance, the subject invention may be used with many different types of electronic equipment although video cameras are used as an example and illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, a primary object of the subject invention to provide a waterproof integumentary enclosure for electronic equipment, especially video cameras, by means of which said equipment may be used underwater.

It is also a primary object of the subject invention to provide a waterproof integumentary enclosure in the form of a thin, flexible and transparent membrane which closely conforms to the shape of a variety of different video and still cameras as well as other electronic equipment.

It is also a primary object of the present invention to provide a waterproof integument for electronic equipment, said integument providing a means for uninhibited access to and operation of audio, video and infra-red components of the equipment.

Another object of the subject invention is to provide a waterproof integument for electronic equipment; said invention being relatively simple in its construction and therefore inexpensive to manufacture and purchase.

It is also an object of the present invention to provide an integumentary membrane capable of protecting electronic equipment from rain, snow, moisture, sand, dirt and other particulate matter.

It is another object of the present invention to provide an integumentary enclosure for electronic equipment; said enclosure requiring no special training or difficult procedures to master for successful use.

Still another object of the present invention is to provide an integumentary enclosure for electronic equipment; said enclosure being disposable after each use, thereby insuring against future contamination to protected equipment occurring from residual matter on the membrane.

Yet another object of the present invention is to provide an integumentary enclosure for electronic equipment which, when packaged, is sufficiently small and compact to be carried in a camera bag, clothing pocket or otherwise readily accessible for use.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2A is a side elevation of a first embodiment of the electronic equipment support platform and air extraction means of the subject invention, various sub-components of which are depicted in phantom line, cutaway or exploded view to better illustrate the interrelations thereof;

FIG. 2B is an enlarged view of ratchet assembly components as mounted within the air extraction and compression shaft collar of the invention of FIG. 2A;

FIG. 15 is a cross sectional view of the optional lens adapter system completely installed onto a conventional camera.

DETAILED DESCRIPTION OF THE INVENTION

Two embodiments of the subject invention are described herein. Each share in common two of three primary components. These primary components are an integumentary enclosure, a camera support platform, and a combination air extraction and membrane closure means.

FIRST EMBODIMENT

Figure 1:
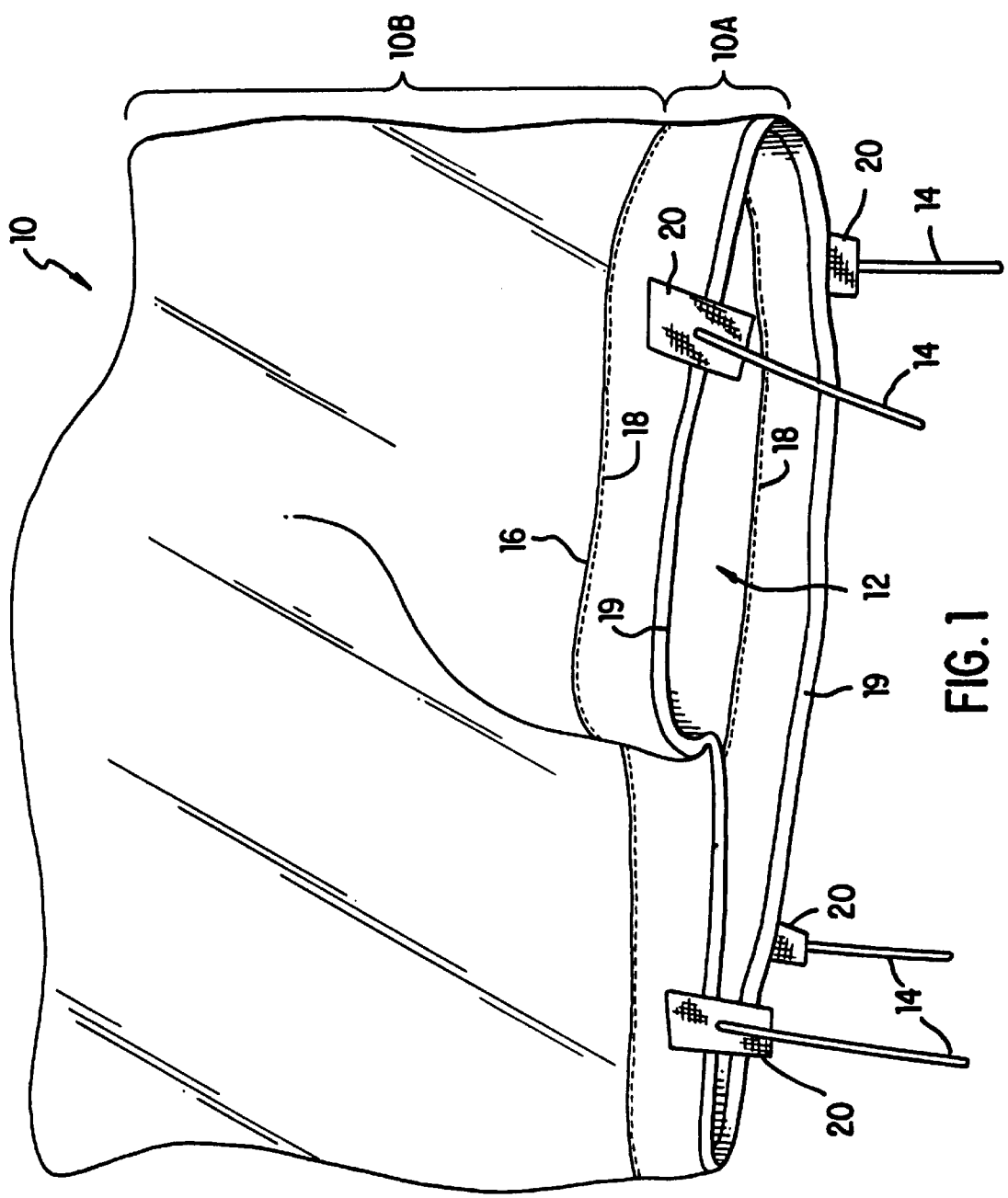
FIG. 1 is a plan view of the integumentary enclosure component of the subject invention.
Figure 3:
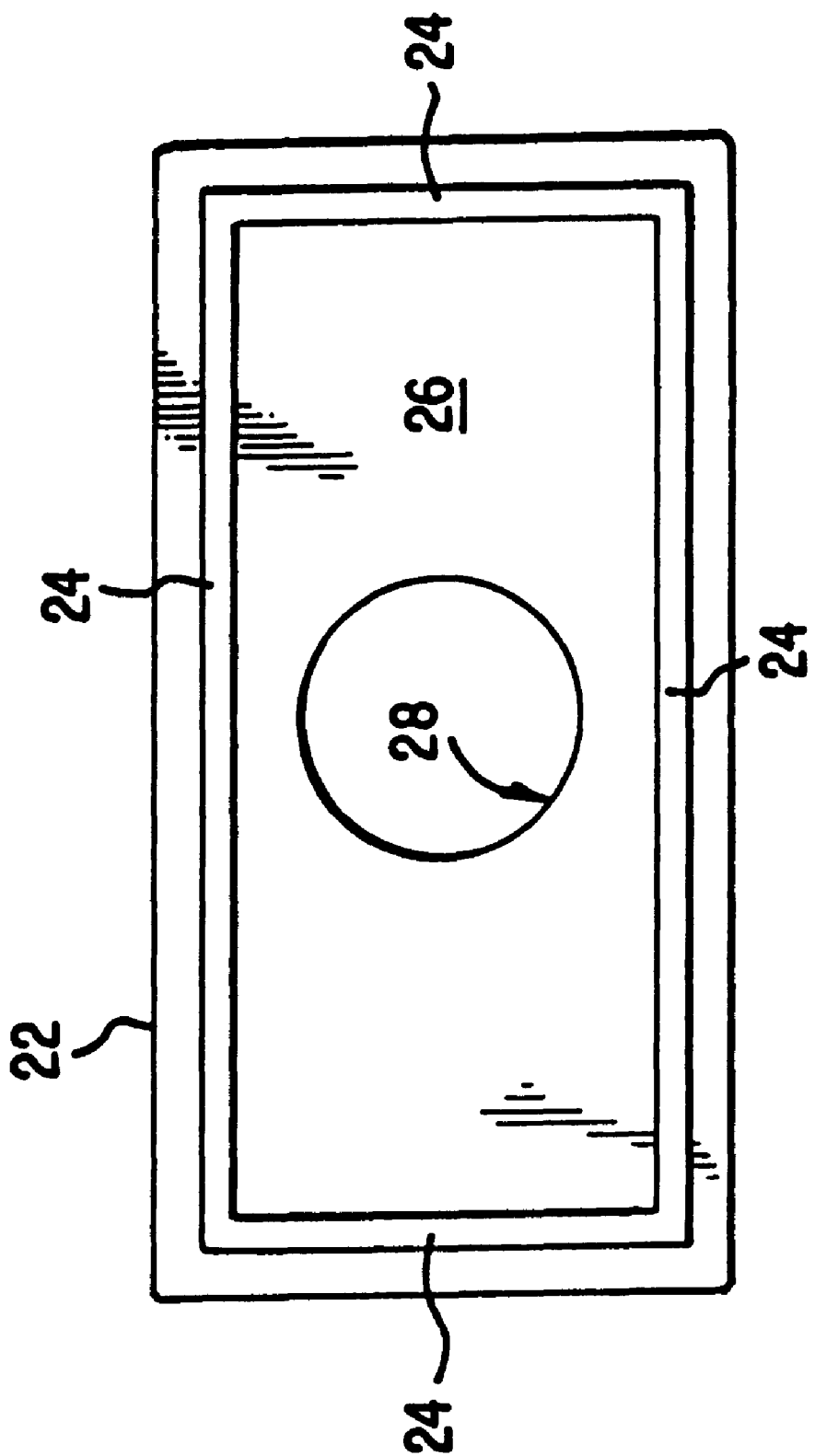
FIG. 3 is a plan view of the platform component of the subject apparatus.

Reference is now made to FIG. 1 in which there is illustrated a plan view of the first of the three primary components of the subject invention, namely the integumentary enclosure designated generally by reference numeral 10. The terms "integument", "enclosure" and "membrane", as well as combinations and derivatives thereof, are used synonymously herein. As may readily be observed, integument 10 is manufactured into a bag-like configuration having a single opening 12 for the reception of the electronic equipment to be protected therein. This optically transparent membrane is substantially flexible in nature and impermeable to water and other fluids. Integument 10 may be fabricated of a thermal plastic film of any suitable material such as acetates, acrylics, cellulose acetate butylates, polycarbonates, polystyrenes, vinyls or ionmers with polyvinyl being preferred. Thickness may vary from as little as 0.025 mm to a maximum thickness as determined by the material's ability to remain flexible and achieve its intended objects as set forth above and below.

The open end of integumentary enclosure 10 is adapted with four guide wires 14, each extending perpendicularly from the enclosure's edge. Guide wires are fixedly attached to enclosure 10 using an appropriate adhesive tape 20 or by other suitable means. The enclosure is also modified with a color identification band 16 around its entire perimeter. Band 16 may be observed to run in parallel with perforation 18 which, in turn, is situate approximately one inch above the enclosure's edge 19. Perforation 18 permits detachment of the enclosure's distal end 10A from the main body 10B. The functionality of each of these features is explained below.

Referring now to FIG. 2A, the remaining two primary components of the subject invention are depicted in phantom line, cutaway or exploded view to better illustrate how the sub-components thereof interrelate. The second primary component is comprised of a rectangular support platform 22 upon which the equipment is secured for use. For illustrative purposes only, a video camera 100 is depicted as the equipment to be protected. It should readily be understood, however, that said camera does not form a part of the subject invention.

Front, back and side retaining walls 24 may be fixedly mounted to the top surface 26 of platform 22 to limit movement of the equipment on surface 26. Both platform 22 and retaining walls 24 are preferably made of a closed-cell foam product which is generally soft, durable and buoyant. Platform 22 is further adapted with aperture 28, shown in phantom lines, disposed through the platform's center. A plan view of platform 22 is provided at FIG. 2C.

With continued reference to FIG. 1, a first embodiment of the third and final primary component is illustrated and consists of a combination air extraction and membrane closure means 30 which itself is comprised very generally of an elongated tubular shaft member 32 rotatably mounted to platform 22 via shaft-to-platform adaptor 34. To accomplish the connection, annular ring 36 of adaptor 34 is inserted into aperture 28 and fixedly attached using conventional means. The respective diameters of aperture 28 and ring 36 are such as to form a snug, air-tight fit.

The proximal end 38 of shaft 32 is fitted with annular collar 40. The distal end 42 of adaptor 34 and the interior surface of collar 40 are reciprocally threaded to accomplish the rotatable connection of shaft 32 to platform 22. Adaptor 34 and shaft 32 are each adapted with components of a ratchet assembly to permit precise incremental rotation of shaft 32 relative to platform 22. More particularly, adaptor 34 is modified with a plurality of incrementally spaced ratchet teeth 44 situate between ring 36 and distal end 42. A ratchet pin 46 is disposed through the flanged portion of collar 40 as more easily observed upon reference to FIG. 2B. Pin 46 terminates at one end with ratchet release handle 48 and at the opposite end with ratchet head 50. As shaft 32 is screwed onto adaptor 34, ratchet head 50 is caused to engage ratchet teeth 44 thereby creating incremental, non-reversible movement of the shaft. Ratchet head 50 is biased against ratchet teeth 44 through the employment of spring 52.

Returning once again to FIG. 2A, a membrane compression screw 54 is threaded perpendicularly through the wall of shaft 32 at about its midpoint. As may be seen through the cutaway portion of the shaft, the interior wall 56 of shaft 32 is equipped with two protruding ridges 58. As will be described in greater detail, infra, compression screw 54 will be used to urge the integumentary membrane between ridges 58 and against interior wall 56 to form a secondary air and water-tight seal of the enclosure.

The distal end 60 of shaft 32 is also threaded to receive end cap 62 shown here in cross-section. Note that the distal edge 64 of shaft 60 is rounded for purposes which will be explained below. End cap 62 houses a gasket 66 at the base of its interior walls for sealing purposes. Other methods of ensuring a proper seal will be recognized by those skilled in the art. An air evacuation port 68 is concentrically aligned with aperture 28 of platform 22 and is situate at the base of cap 62. Evacuation port 68 is sized to receive both port closure means 70, preferably in the form of a rubber plug, and evacuation tube 72. Again, a proper seal is ensured using second gasket 74 or other appropriate means.

Figure 4A:
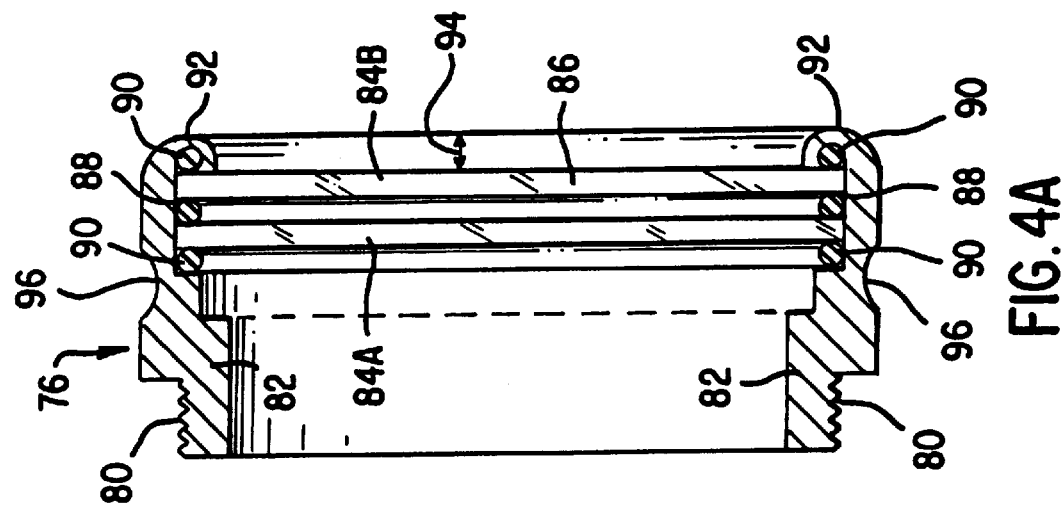
FIG. 4A is a cross-sectional view of a first optional camera lens adapter component of the subject invention.
Figure 4B:
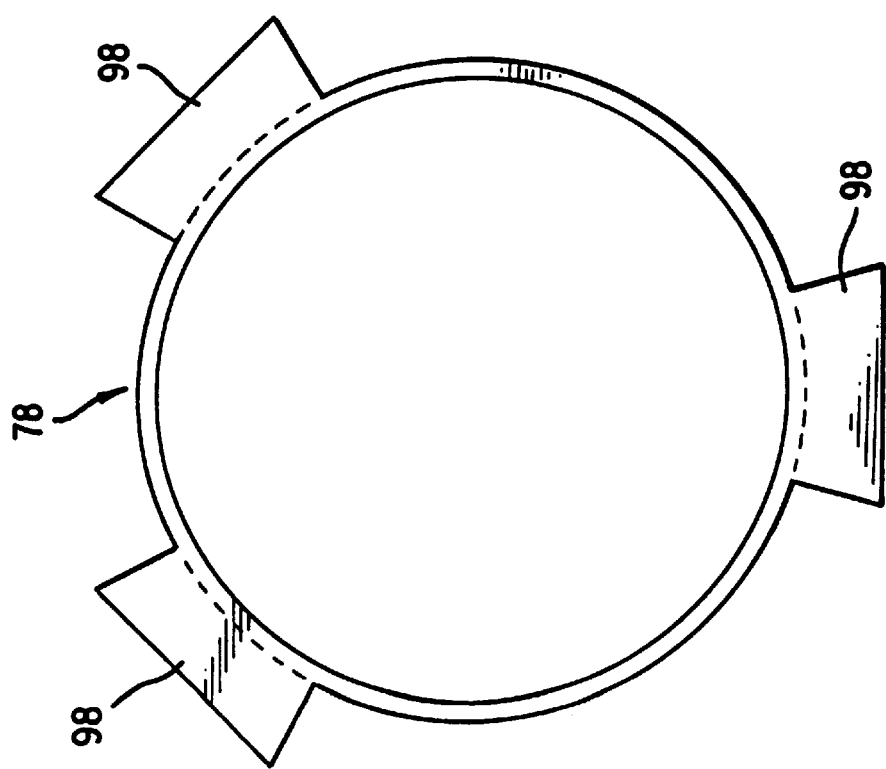
FIG. 4B is a plan view of a flanged contraction ring used to tightly conform the integumentary membrane over the surface of the camera's lens.

Reference still being made to FIG. 2A, two remaining components of the subject invention are depicted; namely an insulating/pressure compensation lens adapter 76 and membrane adjustment ring 78. Each are depicted in greater detail in FIGS. 4A and 4B to which attention should now be directed.

Insulating/pressure compensation lens adapter 76 is optionally attached to the existing lens system of video and camera equipment via threads 80. Shown here in cross-sectional view, this lens adapter is comprised of housing 82 which holds two lenses 84A and 84B in parallel relationship. An air space 86 is created between each lens via lens gasket 88. The purpose of this lens configuration (separation) is to provide an insulating barrier between the electronic equipment's ambient temperature and that of the surrounding water in order to prevent lens fogging. Second and third gaskets 90 are placed on lens surfaces opposite those in contact with lens gasket 88 to assure proper seating of the lenses within the housing and for sealing purposes. Note that the distal edges 92 of housing 82 are tapered. The purpose of the tapering is to prevent tearing of the integumentary enclosure when tightened about the adapter housing. It is also important to note that the setback distance 94 between lens 84B and the distal edge 92 of housing 82 is preferably 1/16 inch. Applicant has determined that such a setback is necessary to avoid rubbing of the membrane against the lens surface during the membrane application process described below, while simultaneously limiting the degree of membrane distortion when exposed to sub-atmospheric conditions such as are encountered when operating the equipment under water. Integumentary enclosure 10 is kept tightly in place over lens adapter 76 using elastic membrane adjusting ring 78 which is seated within groove 96 of housing 82. It should be appreciated that video or photographic distortion may be prevented by assuring a tight, wrinkle-free fit of the membrane over lens adapter 76. Finally, to facilitate removal and repositioning of adjustment ring 78 with respect to the lens adapter, tabs 98 may be incrementally spaced about the perimeter of the ring. Alternatively, one continuous flange may be employed for this purpose.

METHOD OF USE

Reference is now made to FIGS. 5–9 for the purpose of describing the invention's application to a common video camera for underwater use. The first step will be to determine whether use of the optional lens adapter 76 is necessary. This will usually depend on two factors; first, whether there is a significant temperature difference between water and air, and second, whether the video camera's own lens system is incapable of preventing membrane distortion under pressure. Answering either query in the affirmative suggests that employment of the lens adapter is appropriate.

Figure 5:
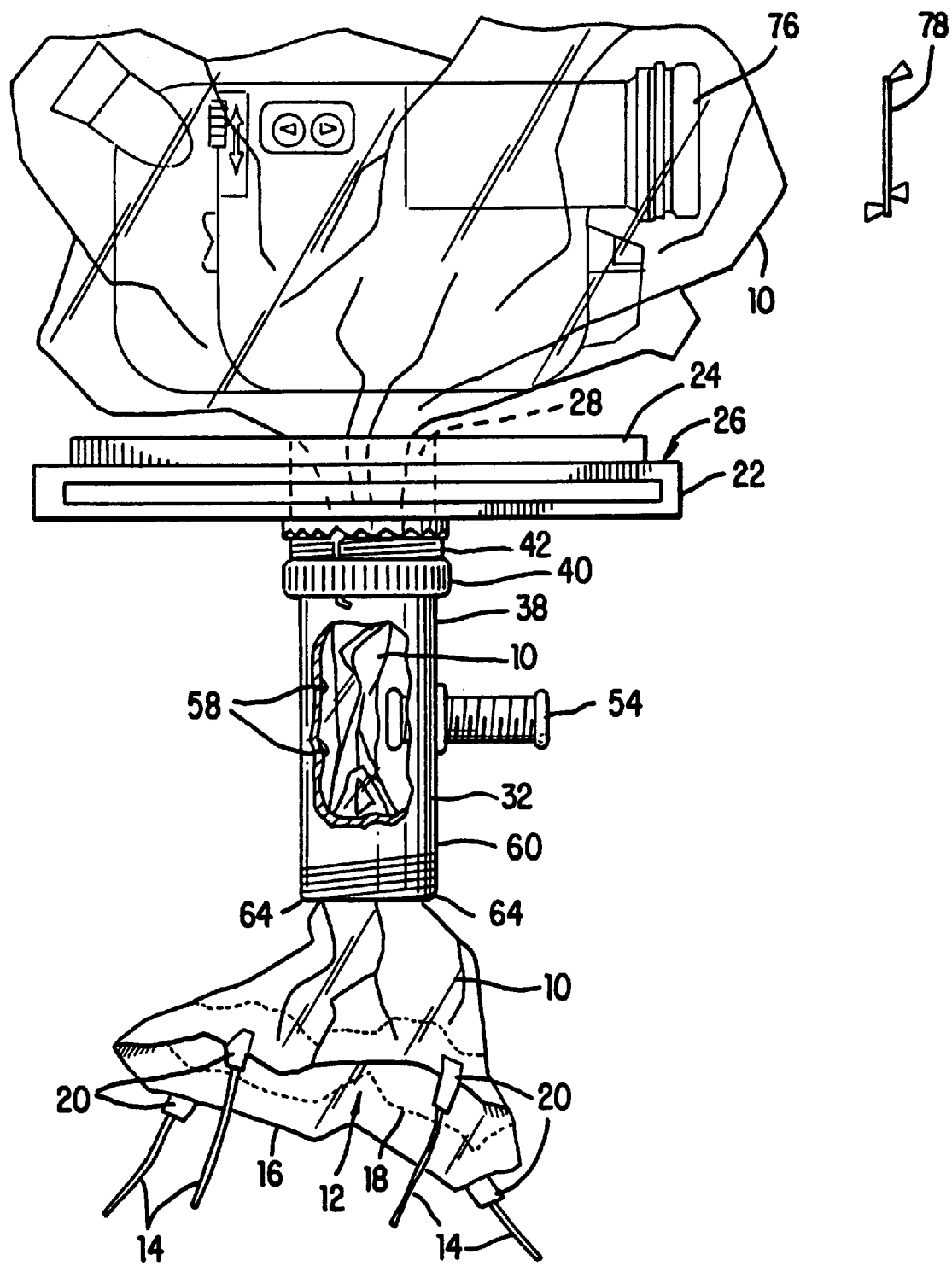
FIGS. 5–9 are side elevation views of the invention of FIG. 2A during various stages of its application to a conventional video camera.

Next, the video camera is placed into the integumentary enclosure, top end first. The open end 12 of the enclosure is then threaded through both the platform's aperture 28 and tubular shaft 32 until it emerges from the distal end 60 of the shaft (FIG. 5). If the very thin integument 10 begins to bunch together, guide wires 14 may be twisted together and fed through the shaft opening to facilitate the enclosure's passage. Note that compression screw 54 should be unscrewed to the extent possible such that it does not interfere with the threading process. Once the open end 12 of membrane 10 is completely through the shaft 32, the enclosure should be adjusted to the best fit possible around the video camera by removing slack and repositioning the camera on the top surface 26 of platform 22.

Figure 6:
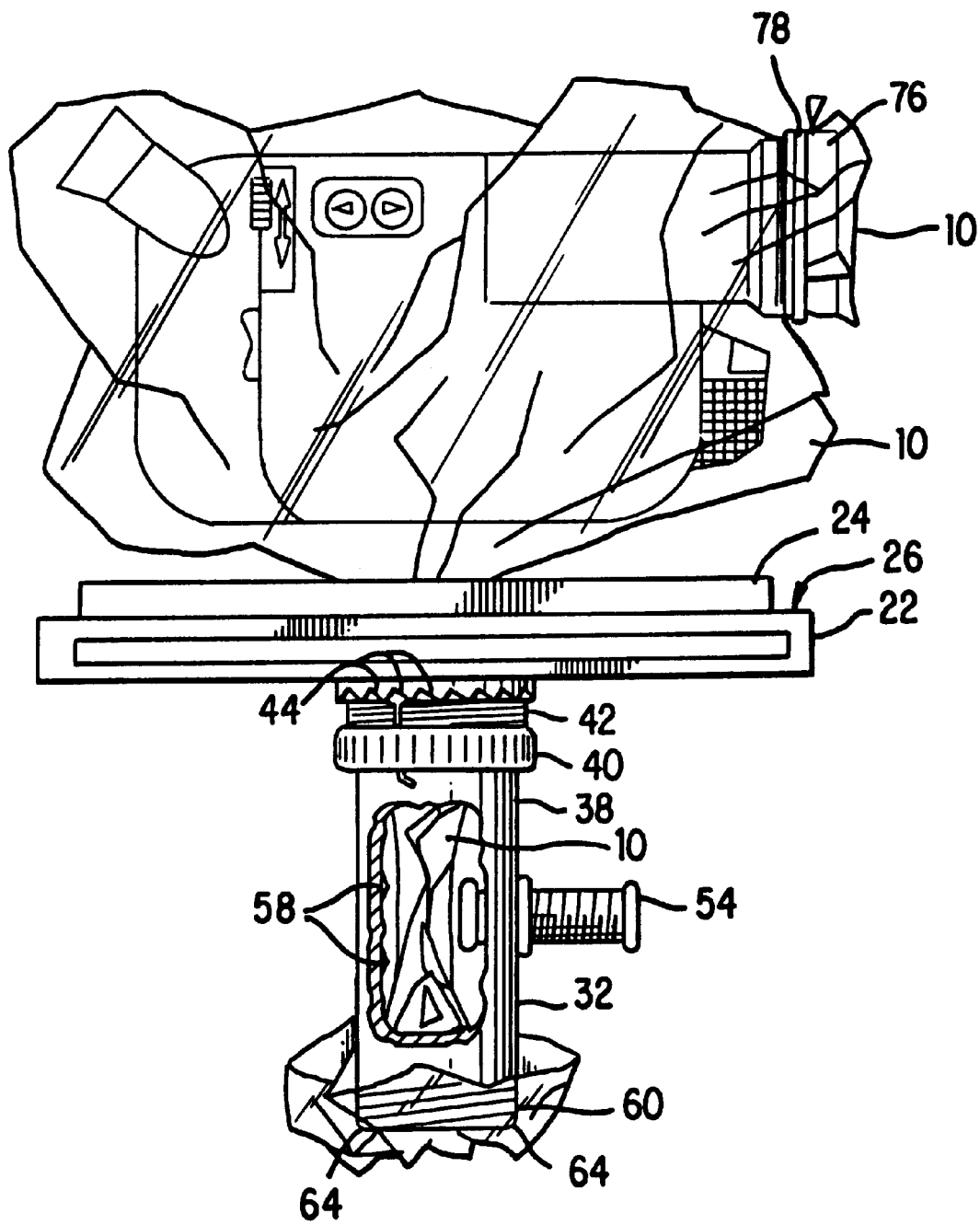

Referring now to FIG. 6, once the bulk of slack has been removed, the distal end 10A of the membrane should be removed from the main body 10B of enclosure 10 by tearing along perforation 18. Distal end 10A, together with guide wires 14, may be discarded. The balance of the open end 12 should then be folded upward around the exterior of shaft 32. Additionally, membrane adjustment ring 78 may be placed around lens adapter 76 generally, and held within notch 96, in particular.

Figure 7:
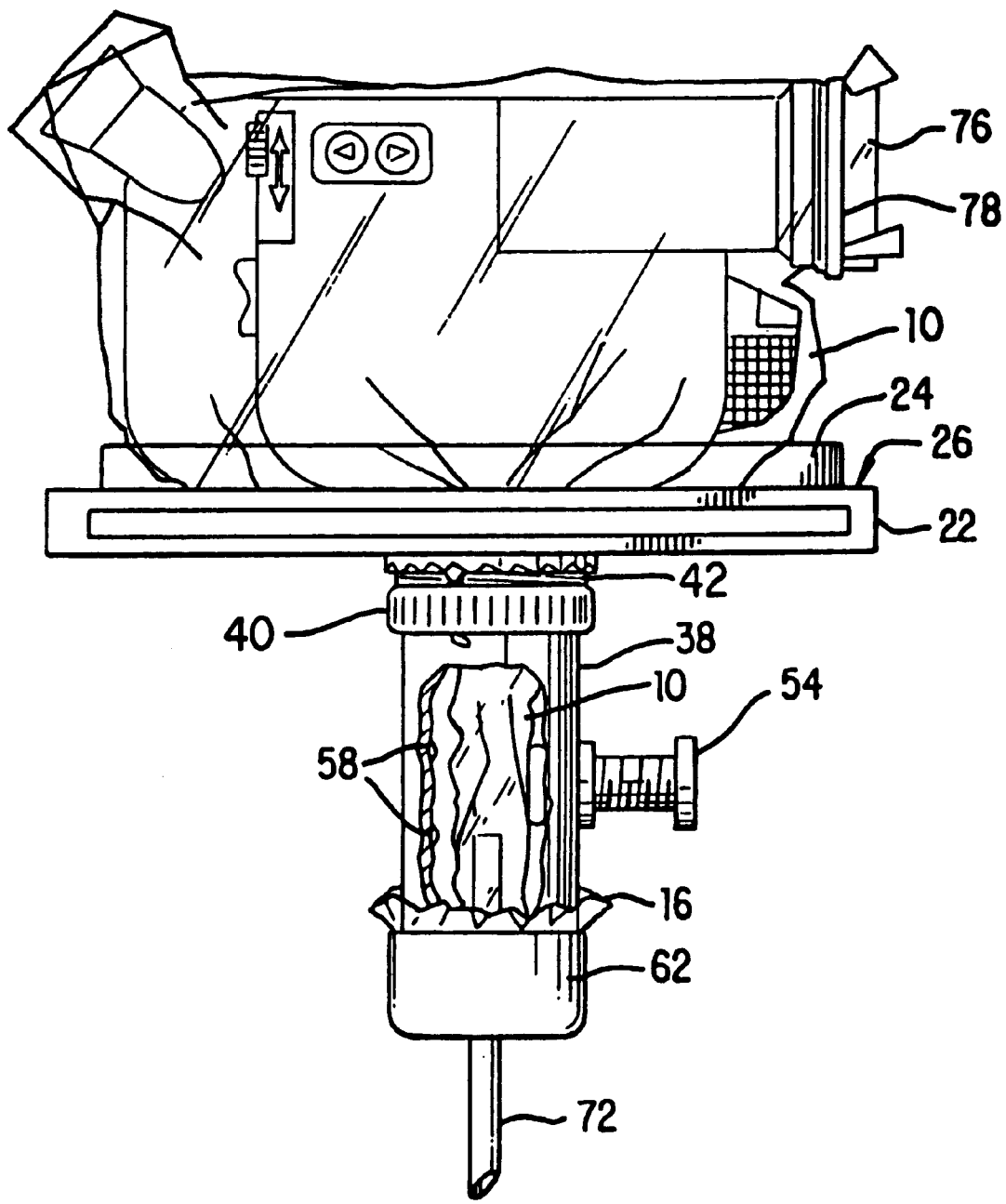

Reference now being made to FIG. 7, the subject invention is ready for the air evacuation procedure. Note at this stage that membrane slack over the lens (FIG. 6) has been removed. This is accomplished by gently grasping and lifting tabs 98 while pulling the membrane until smooth in appearance across the lens surface area. Note further that cap 62 has been secured in place and that the entire length of color band 16 remains visualized above the cap. Visualization of the entire length of color band 16 assures that the enclosure is properly positioned to avoid leaks. Also note that evacuation tube 72 has been inserted through evacuation port 68 and into the open end 12 of the enclosure 10. Finally, note that the video camera is properly positioned within retaining walls 24.

Figure 8:
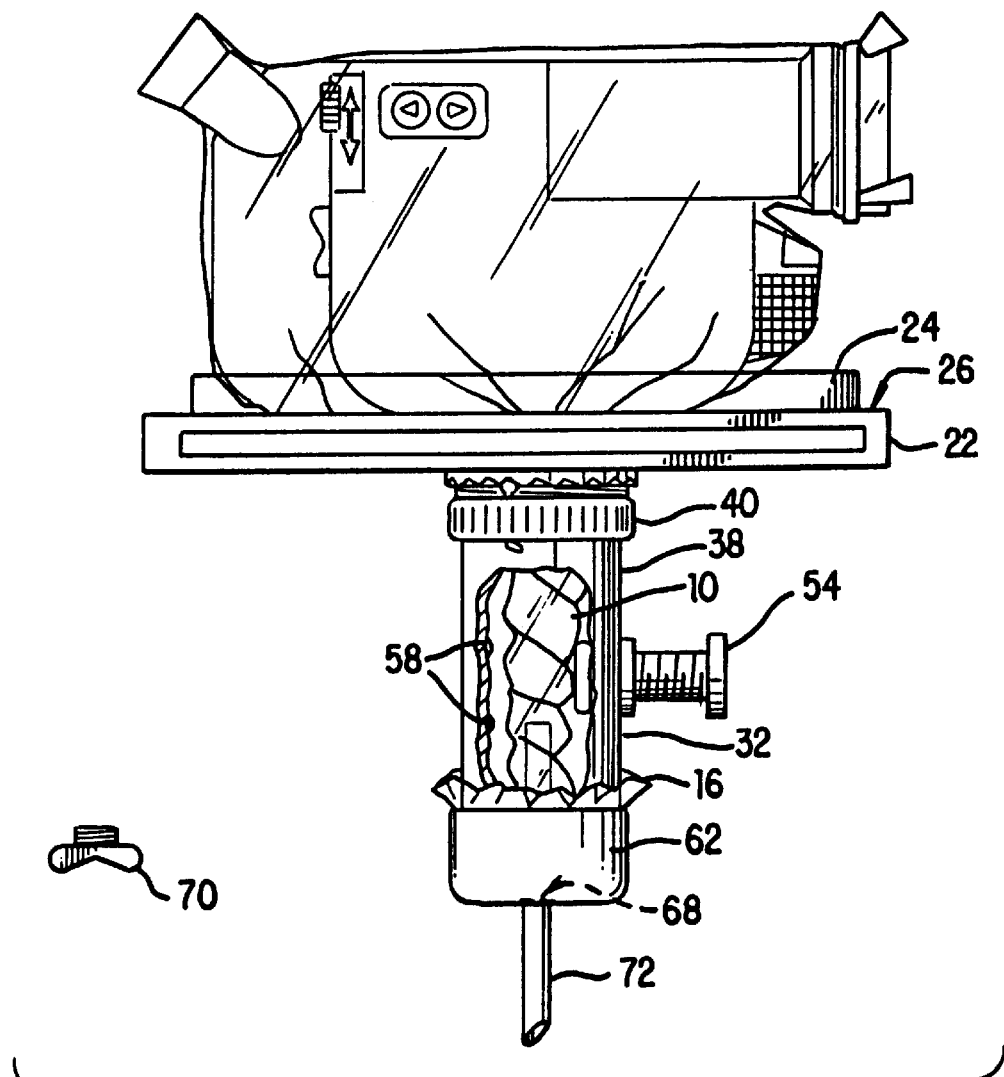
Figure 9:
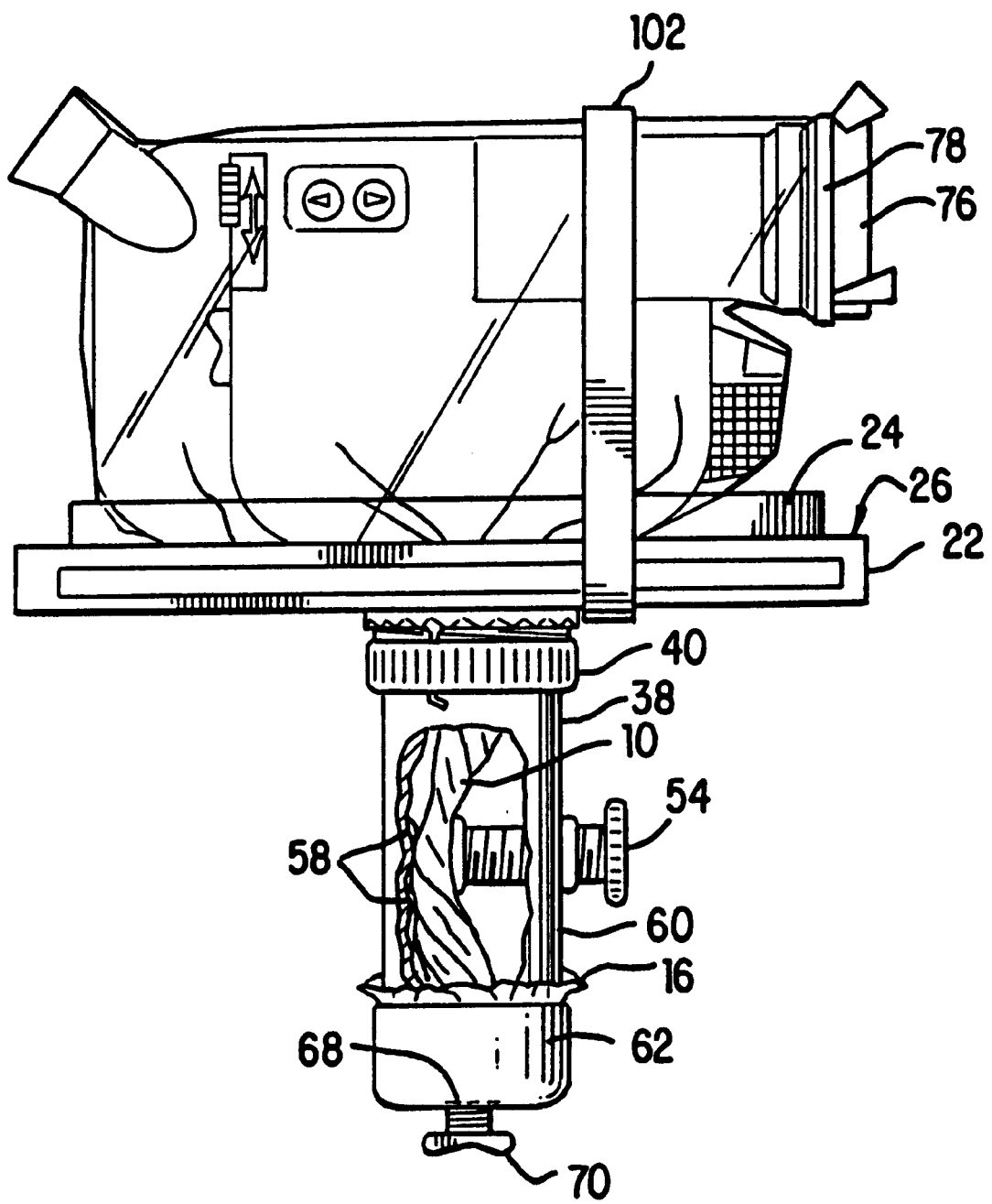

Referring now to FIG. 8, it may be observed that enclosure 10 is closely conformed to the contours of the video camera, thus forming a skin or integument around same which not only protects the equipment from water and the elements, but also provides uninhibited access to and operation of audio, video and infra-red components of the equipment. Conformity of the membrane to the equipment surface is accomplished by withdrawing air within the enclosure 10 through evacuation tube 72 either manually with the mouth, or by mechanical means. Upon removal of air from the system, shaft 32 is rotated about platform 22 until ratchet head 50 (FIG. 2B) engages ratchet teeth 44. Thereafter, the shaft should be turned until a predesignated number of "clicks" is achieved. This number will have been predetermined and will depend on the number of ratchet teeth, the diameter of the shaft and other factors which will be obvious to one having reasonable skill in the art. The predetermined number of clicks should be that number which causes membrane 10 to twist snugly about evacuation tube 72 such that it may be removed without tearing the membrane. Upon removal of evacuation tube 72, the twisted membrane will close in on itself thereby creating an air and water-tight barrier between the equipment and its environment outside of the membrane. The shaft may be further rotated to tighten the seal. Closure means 70 should then be placed within evacuation port 68 to create the primary seal of the system (FIG. 9).

As a final precaution, compression screw 54 is then tightened to force the twisted membrane between compression ridges 58 and against the interior wall 56 of the shaft to create another secondary seal. Here again, caution should be exercised so as not to tear the membrane during tightening. Securing means 102 may be used to secure the equipment to platform 22. A simple elastic band or strap with conventional closure means is preferred.

Thusly configured, the subject apparatus and equipment therein are ready for underwater use and in otherwise hostile environments such as on the beach, in rain, snow, etcetera. It should be recognized that the subject invention is intended to provide a means for underwater use of equipment at only moderate depths. The system is not intended for use a greater depths which require pressurization of the system. The subject system is, however, adequate for use in conventional swimming pools and natural bodies of water of similar depths.

A SECOND EMBODIMENT

As previously mentioned, the second embodiment of the subject invention shares in common the first two primary components, namely, integumentary enclosure 10 and support platform 22. With regard to the means for extracting air from and sealing the enclosure, however, attention is directed to FIG. 10A wherein a housing unit 102 may be observed fixedly mounted to the underside of support platform 22 in a water-tight manner. Housing unit 102 is generally rectangular in shape and is comprised of base plate 104 and lid 106. The upper surface of base plate 104 is flat and situate in co-planer relationship with support platform 22. Various means may be employed to mount base plate 104 to the platform provided said method ensures a water-tight union.

Figure 10:
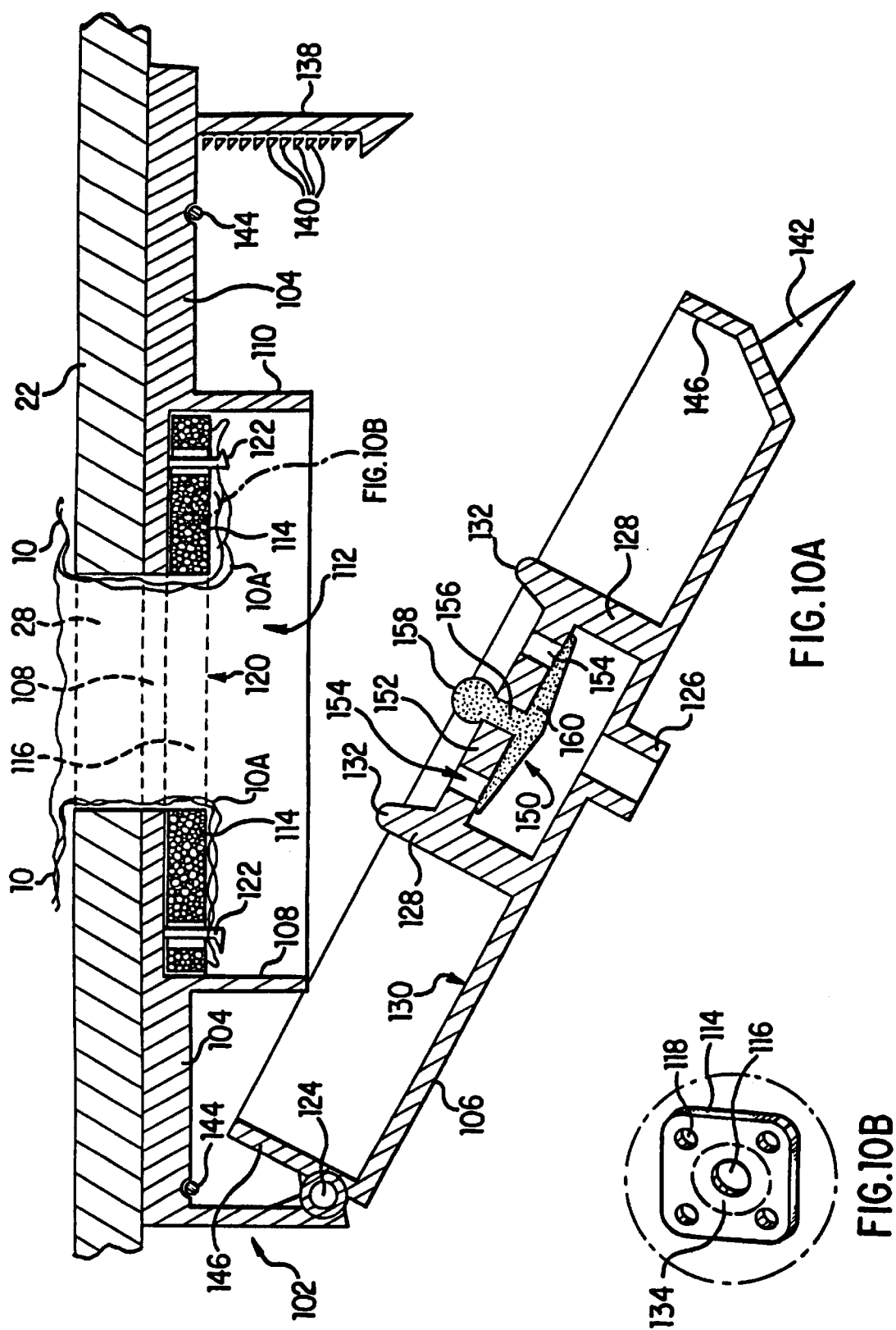
FIG. 10A is a cross sectional view of a second embodiment of the subject invention's air extraction and membrane closure means with open lid.
FIG. 10B is a perspective view of the compression pad component of the air extraction and membrane closure means of FIG. 10A.

Base plate 104 includes a base plate aperture 108 in concentric alignment with aperture 28 of platform 22. The bottom side of base plate 104 is adapted with four perpendicularly extending retaining walls 110 which together form retention basin 112 for the slidable reception of a closed-cell foam compression pad 114. Referring temporarily to FIG. 10B, a perspective view of compression pad 114 is depicted revealing central aperture 116 and four foramen 118, the purposes of which are set forth below. Compression pad 114 is shaped to snugly conform to the interior surfaces of retention walls 110 and is thus held in place within retention basin 112 with a mild interference fit. Note that when properly seated, the top surface of compression pad 114 is in direct contact with the bottom surface of the retention basin generally, and with the bottom surface of base plate 104 specifically. Note further that platform aperture 28, base plate aperture 108 and compression pad central aperture 116 are all concentrically aligned to form channel 120.

Finally, base plate 104 is equipped with membrane retention means which, in the embodiment described herein take the form of four retention hooks 122 disposed through foramen 118 of compression pad 114. It should be readily apparent that the inclusion of foramen 118 in compression pad 114 is intended only for the accommodation of hooks 122 and that alternate means of retaining the distal end 10A of enclosure 10 in an open position may be employed, the immediate example being illustrative only.

Figure 11:
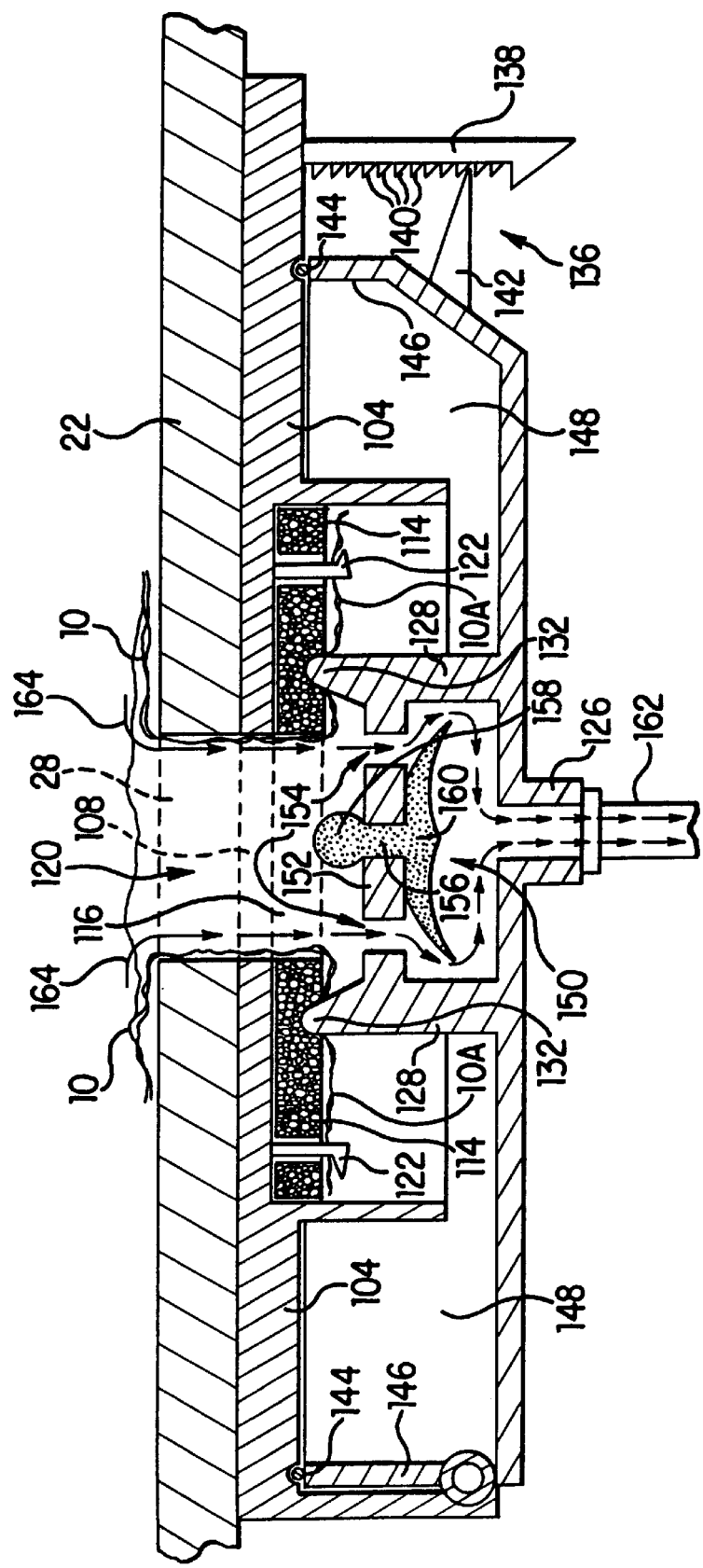
FIG. 11 is a cross sectional view of the air extraction and membrane closure means of FIG. 10 with the lid closed and membrane sealed.

With continued reference to FIG. 10A, lid 106 is depicted in an open position and pivotally mounted to base plate 104 of housing unit 102 via hinge 124. Lid 106 includes a centrally located air evacuation port 126 in concentric alignment or otherwise in communication with channel 120 when lid 106 is in the closed position (FIG. 11). Evacuation port 126 is capable of receiving external vacuum means (not shown) and may be threaded, tapered, ribbed or otherwise modified to facilitate mating with said vacuum means.

Lid 106 further includes a compression ring 128 which is integrally formed with or fixedly mounted to the top or interior surface 130 of lid 106. Referring to FIG. 11, compression ring 128 is concentrically aligned with channel 120 and larger in diameter such that when lid 106 is closed, the distal edge or lip 132 of the ring contacts a compression zone 134 (FIG. 10B) of compression pad 114. Note that lip 132 is contoured to form a smooth tapered surface which will engage compression pad 114 and compress same without tearing as lid 106 is closed, thereby trapping the entire circumference of the distal end 10A of membrane 10 there between. Lid 106 and base plate 104 are also fitted with closure and locking means which, by way of example only, are depicted as a ratchet assembly 136 including a semi-rigid shaft 138 having a plurality of incrementally spaced ratchet teeth 140 for the reception of pawl 142. Base plate 104 may optionally include a gasket 144 in alignment with lid walls 146 to form a water-tight seal between the base plate and lid when the latter is closed. This has the double benefit of forming an interior chamber 148 which can hold trapped air for added buoyancy of the subject invention and create a secondary barrier capable of preventing water or air from entering the interior of membrane 10.

Referring to FIG. 10A, the interior of compression ring 128 contains a mono-valve 150 held in place by transverse valve mounting seat 152. Those skilled in the art will recognize that mono-valves exist in a variety of shapes and sizes. In the immediate example, valve mounting seat 152 is depicted in planer form although it is not uncommon for this component to be concave in shape. Seat 152 is perforated or otherwise includes a plurality of passages 154 which permit the flow of air through seat 152 when the valve is open (FIG. 11). Seat 152 further includes a centrally located opening through which valve 150 is disposed. More specifically, the stem 156 of valve 150 is disposed through the opening of seat 152 and is held in place at one end by stop 158. The opposite end of stem 156 is equipped with a tapered flange 160 the upper surface of which abuts the bottom surface of seat 152 when in the closed position as shown.

METHOD OF USE

Operation of the second embodiment of the air extraction and membrane closure means is relatively simple as compared to the first embodiment described above. Here, the distal end 10A of enclosure 10 is inserted through channel 120 and spread out evenly over the surface of compression pad 114 and held in place using retention hooks 122 which pierce the membrane. When properly positioned, enclosure 10 will remain open to allow for the passage of air from its interior through mono-valve 150. Lid 106 is closed causing pawl 142 to engage teeth 140 of ratchet assembly 136 to prevent the lid from opening. As may readily be appreciated, release of lid 106 is accomplished by applying pressure to flexible shaft 138 causing it to bend away from and release pawl 142.

As pressure is gently applied to lid 106, membrane 10 becomes trapped between lip 132 of compression ring 128 compression pad 114 preventing the passage of air or water into enclosure 10. Once the enclosure is sealed as shown in FIG. 11, vacuum means 162 may be mated with evacuation port 126. Upon activation of said vacuum means, the flexible flange 160 of mono-valve 150 is caused to flex downward thereby opening passages 154. As represented by directional arrows 164, air is pulled from the interior of enclosure 10 through channel 120, through passages 154 and finally out evacuation port 126 causing enclosure 10 to collapse around and conform to the video equipment as previously described. Upon deactivation of vacuum means 162, the negative pressure within the enclosure pulls flange 160 upward to close off passages 154 protecting equipment within the enclosure from the outside environment. Air can not be reintroduced into the system until lid 106 of housing unit 102 is opened.

Figure 12:
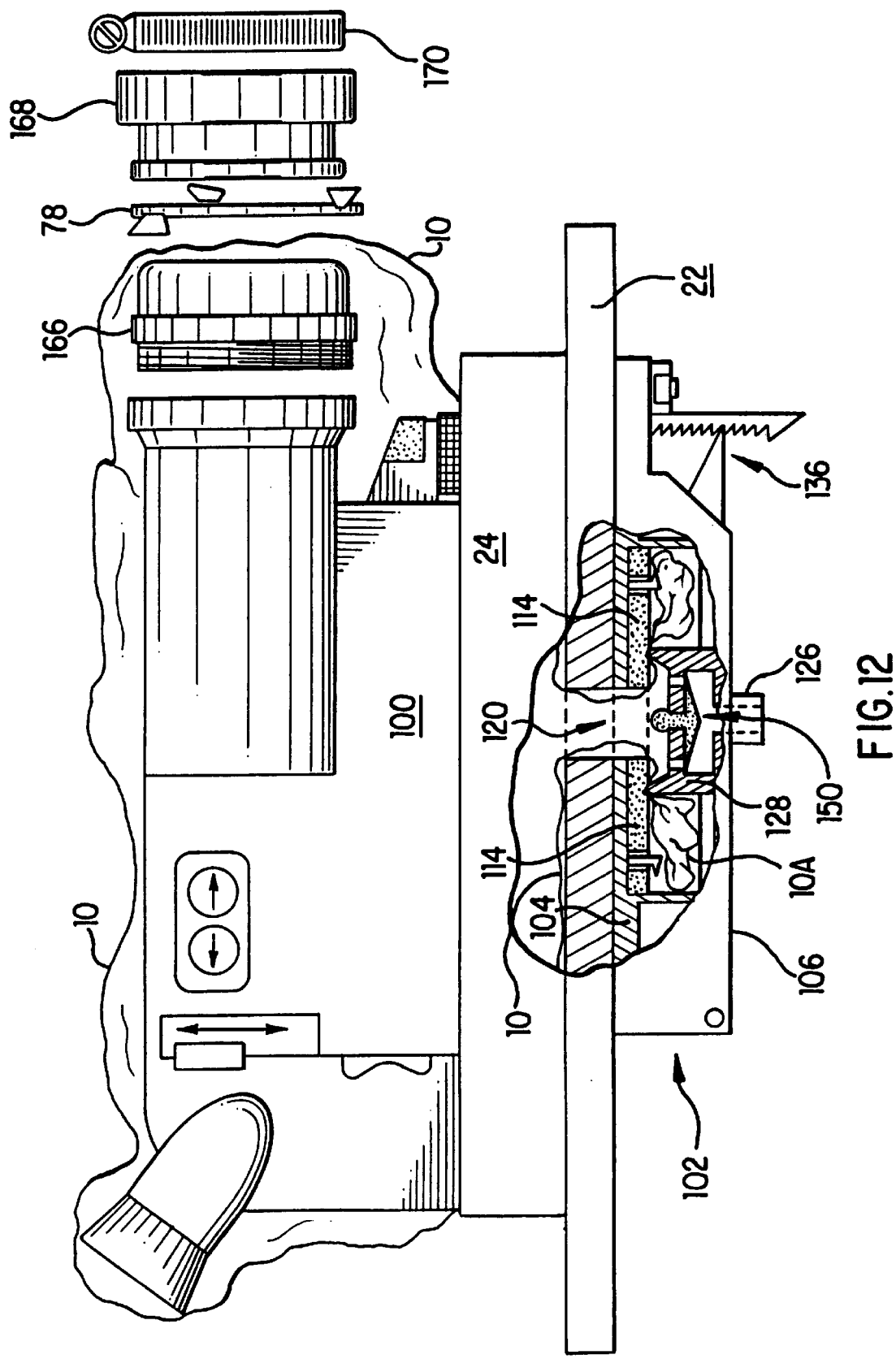
FIG. 12 is a side elevation view of a second embodiment of the subject invention in its entirety, various sub-components of which are depicted in phantom line, cutaway or exploded view to better illustrate the interrelations thereof, and further depicting the primary components of an alternate camera lens adapter system.
Figure 13:
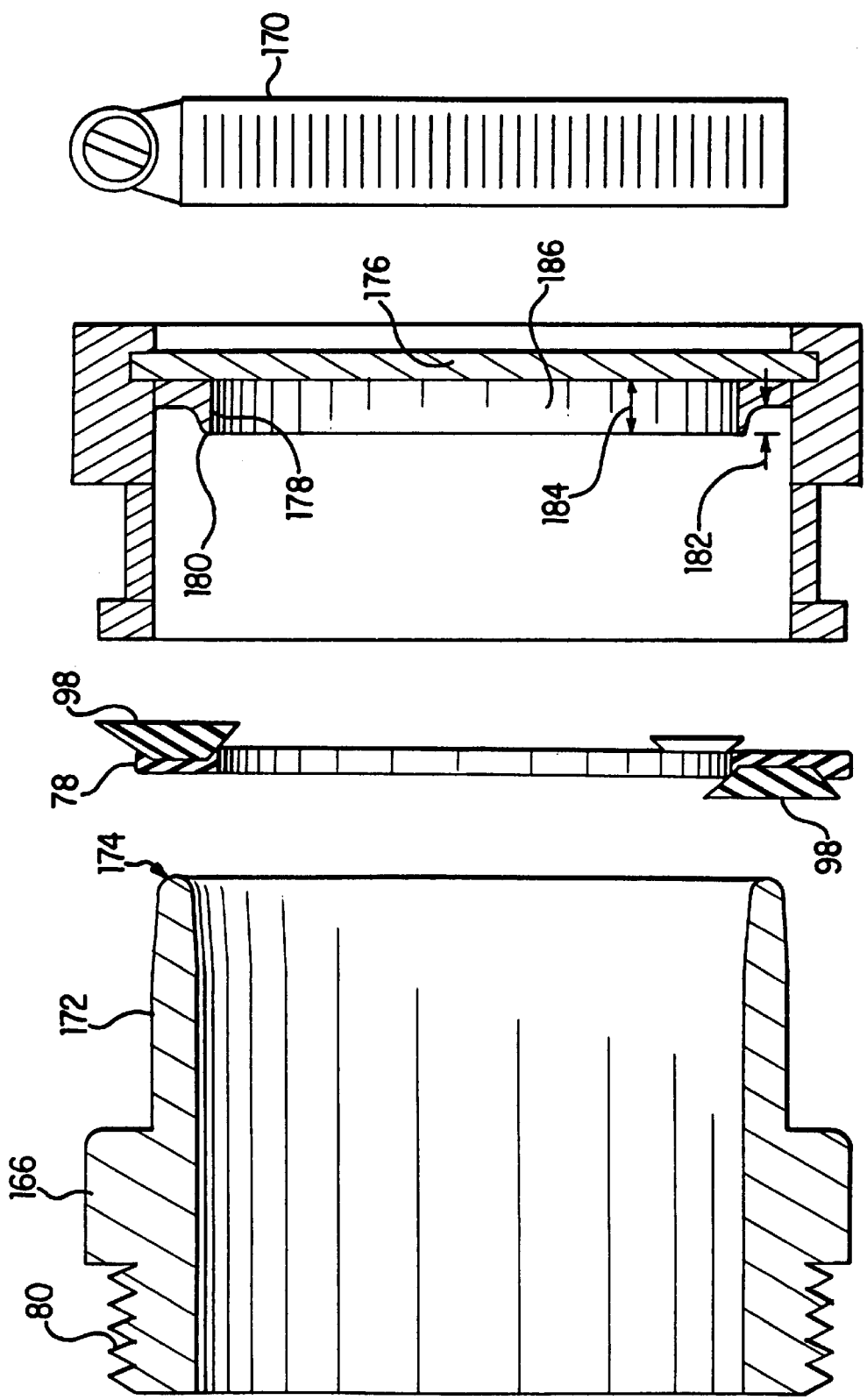
FIG. 13 is a cross sectional view of the primary components of the optional camera lens adapter system of FIG. 12.

FIG. 12 reveals the above described second embodiment of the invention as applied to a video camera for underwater use. Here, video camera 100 is placed within enclosure 10, secured within retaining walls 24 and seated upon support platform 22. The distal end 10A of enclosure 10 has been properly secured within the air extraction and closure means of the invention as set forth in detail above. FIG. 12 further illustrates the use of a second optional lens adapter component of the invention which is preferred over that heretofore described. This second embodiment of the lens adapter component is comprised of four sub-components: a threaded camera lens adapter 166, membrane adjustment ring 78, a sleeve or membrane protector unit 168 and adjustable ring clamp 170. Note that the first of these sub-components, camera lens adapter 166, must be mounted to camera 100 prior to the camera's placement within the enclosure. Referring to FIG. 13, each of these sub-components are depicted in cross-sectional view to provide a more detailed description thereof.

Figure 14:
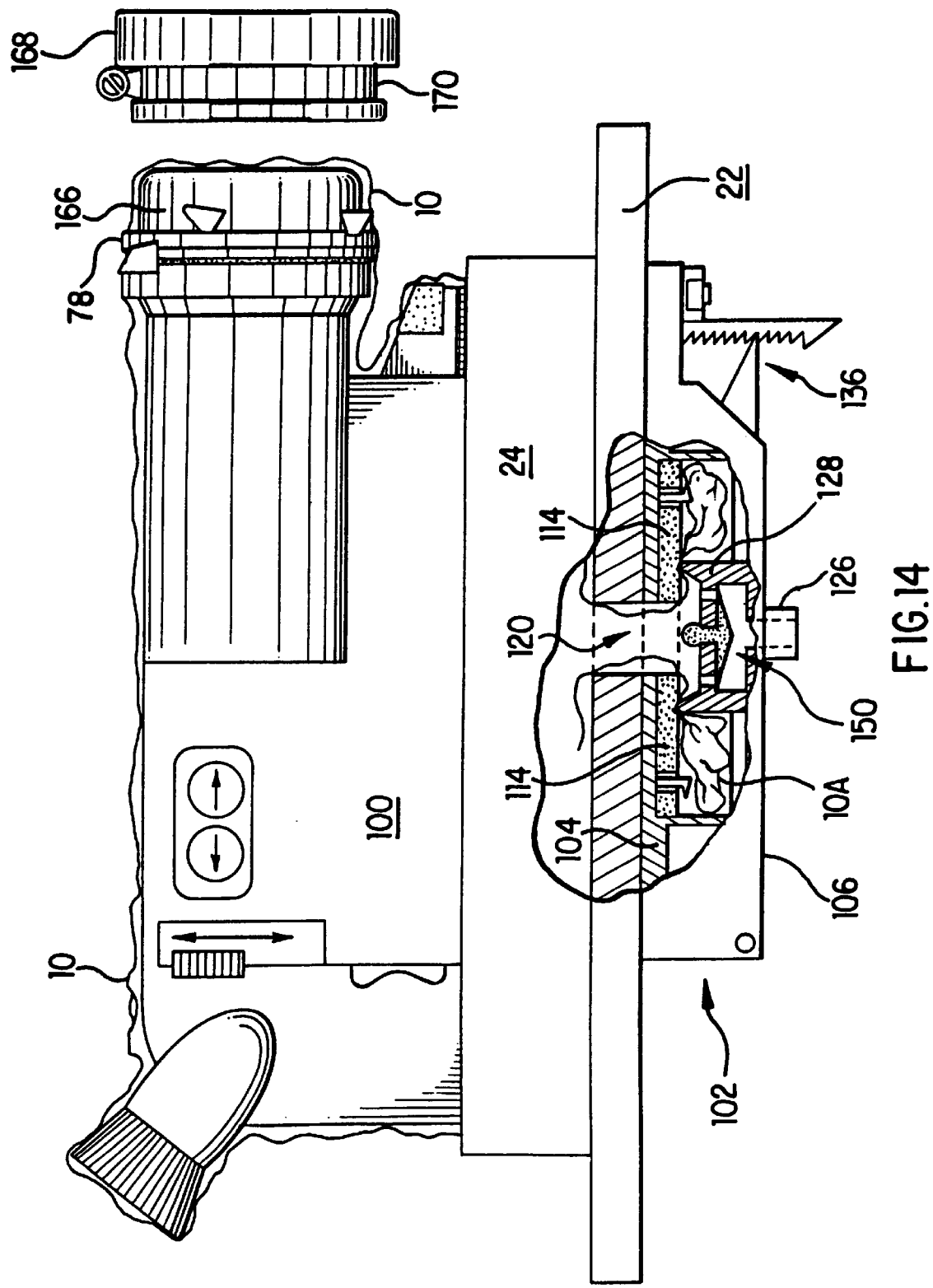
FIG. 14 is a side elevation view of the invention of FIG. 12 with the optional lens adapter system partially employed.

Camera lens adapter 166 is preferably machined out of metal and is mounted to the video camera using threads 80. An extension ring 172 is integrally formed with adapter 166 and terminates in tapered edge 174. The purpose of the tapering is to prevent tearing of the integumentary membrane 10 when tightened about lens adapter 166 as shown in FIGS. 14 and 15. As best illustrated in FIG. 14, membrane adjustment ring 78 is used to provide a preliminary means of securing the membrane around lens adapter 166. Once the user has gently pulled the membrane 10 snugly around adapter 166, the elastic membrane adjustment ring 78 is stretched around ring 172 and released to prevent membrane movement. At this stage, the user can remove the majority of slack and wrinkles in membrane 10 present over camera 100's viewing area.

Referring once again to FIG. 13, membrane protector unit 168 is preferably made of rubber and houses lens 176 which, in turn, is preferably fabricated from an optical grade acrylic. The outer diameter of extension ring 172 and inner diameter of membrane protector unit 168 are sized to permit the slidable reception of the latter over the former with sufficient clearance to accommodate membrane between each without tearing. Thusly positioned and as illustrated in FIG. 15, membrane protector unit 168 and lens 176 together serve to protect this vulnerable area of membrane 10 from damage. Ring clamp 170 is then applied as shown and tightened to secure membrane protector unit 168 onto adapter 166 in a leak-proof manner and to prevent its movement.

Another important feature of this second embodiment of a lens adapter is its ability to insure that membrane 10 is optimally stretched across the camera's viewing area such that it is devoid of all wrinkles and sags which could interfere with filming quality. To accomplish this end, membrane protector unit 168 includes a membrane tensioning ring 178 behind lens 176. Leading edge 180 of tensioning ring 178 is tapered, again to prevent tearing of membrane 10. The outer diameter of tension ring 178 and inner diameter of extension ring 172 are sized to permit the slidable reception of the former within the latter to a depth 182 which is predetermined to cause optimal tension on membrane 10 across the camera's viewing area. It may further be observed that membrane tension ring 178 has a thickness 184 which creates an air space 186 between membrane 10 and lens 176 when membrane protector unit 168 is installed (FIG. 15). Here again, the purpose of this air space is to provide an insulating barrier between the electronic equipment's ambient temperature and that of the surrounding water in order to prevent lens fogging.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. An integumentary enclosure for electronic equipment, particularly cameras, comprising:

(a) an optically transparent membrane of bag-like configuration having an open end for the reception of the electronic equipment;

(b) a support platform upon which the electronic equipment is secured for use, said support platform having an aperture for the passage of said open end of said membrane there through;

(c) membrane closure means mounted below said support platform and in communication with said open end of said membrane; said membrane closure means including a mono-valve for permitting evacuation of air from the interior of said membrane when said mono-valve is open, and for preventing the passage of water into said open end of said membrane when said mono-valve is closed.

2. An integumentary enclosure for electronic equipment, particularly cameras, comprising:

(a) an optically transparent membrane of bag-like configuration having an open end for the reception of the electronic equipment;

(b) a support platform upon which the electronic equipment is secured for use, said support platform having an aperture for the passage of said open end of said membrane there through;

(c) a compression pad mounted below said platform, said compression pad having an aperture in communication with said aperture of said platform for the passage of said open end of said membrane there through;

(d) a compression ring capable of trapping said open end of said membrane between said compression pad and said compression ring; and (e) a mono-valve housed within said compression ring and capable of permitting evacuation of air from the interior of said membrane when said mono-valve is open, and for preventing the passage of water into said open end of said membrane when said mono-valve is closed.

3. A method of sealing electronic equipment within an integumentary enclosure comprising the steps of:

(a) inserting the electronic equipment within an optically transparent membrane having an open end;

(b) threading said open end of said membrane through an aperture of an electronic equipment support platform;

(c) threading said open end of said membrane through an aperture of a compression pad mounted below said support platform;

(d) trapping said open end of said membrane between a compression ring and said compression pad such that the interior of said membrane is in communication with the interior of said compression ring; and (e) withdrawing air through a mono-valve housed within said compression ring until said membrane closely conforms to the contours of said electronic equipment.

4. The integumentary enclosure for electronic equipment of claim 1, further comprising membrane tensioning means for eliminating wrinkles in that portion of said membrane which would lie in front of a camera lens.

5. The integumentary enclosure for electronic equipment of claim 1, further including membrane tensioning means for improving filming quality, comprising:

(a) a cylindrical adaptor adapted to be rotatably mounted to a camera lens; said adaptor being disposed within a portion of said membrane; and (b) a cylindrical sleeve capable of slidable mounting over said adaptor and said membrane; said sleeve housing a membrane tension ring capable of removing wrinkles from an area of said membrane in co-planer alignment with the camera lens when said sleeve is mounted on said adaptor.

6. The integumentary enclosure for electronic equipment of claim 5, wherein said sleeve further houses a membrane protection lens adapted to be in co-planar alignment with the camera lens.

7. The integumentary enclosure for electronic equipment of claim 6, further including an air space between said membrane protection lens and an area of said membrane in co-planar alignment with the camera lens when said membrane protection lens is mounted to the camera lens.

8. The integumentary enclosure for electronic equipment of claim 2, further comprising membrane tensioning means for eliminating wrinkles in that portion of said membrane which would lie in front of a camera lens.

9. The integumentary enclosure for electronic equipment of claim 2, further including membrane tensioning means for improving filming quality, comprising:

(a) a cylindrical adaptor adapted to be rotatably mounted to a camera lens; said adaptor being disposed within a portion of said membrane; and (b) a cylindrical sleeve capable of slidable mounting over said adaptor and said membrane; said sleeve housing a membrane tension ring capable of removing wrinkles from an area of said membrane in co-planer alignment with a camera lens when said sleeve is mounted on said adaptor.

10. The integumentary enclosure for electronic equipment of claim 9, wherein said sleeve further houses a membrane protection lens adapted to be in co-planar alignment with the camera lens when said membrane protection lens is mounted to the camera lens.

11. The integumentary enclosure for electronic equipment of claim 10, further including an air space between said membrane protection lens and an area of said membrane in co-planar alignment with the camera lens when said membrane protection lens is mounted to the camera lens.

* * * * *